UNITED STATES PATENT OFFICE.

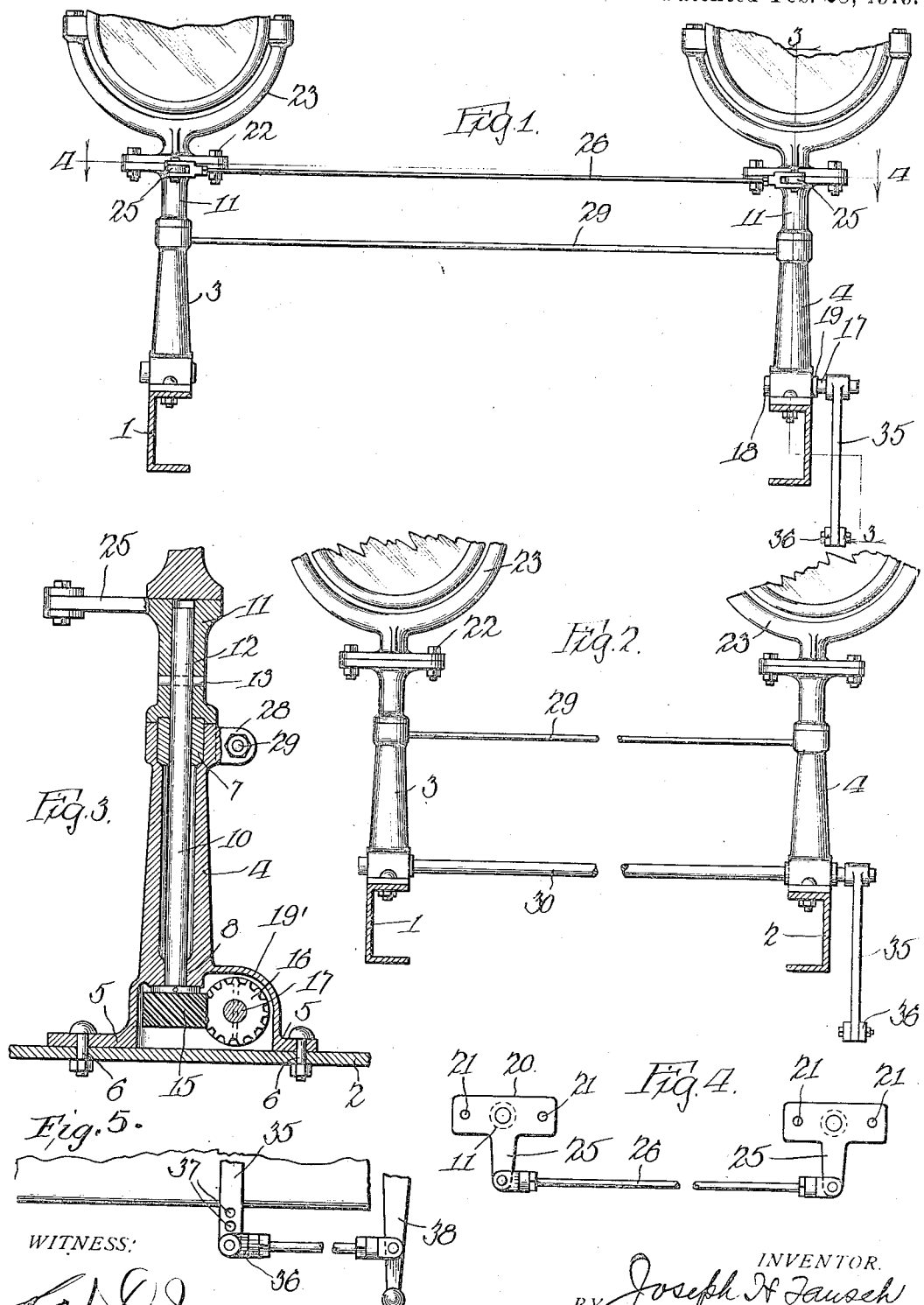

JOSEPH H. TAUSCH, OF WAUKEGAN, ILLINOIS, ASSIGNOR TO PETTIS F. BROWN, OF LUBBOCK, TEXAS.

AUTOMOBILE ROAD-LIGHT.

1,295,385.  Specification of Letters Patent.  Patented Feb. 25, 1919.

Application filed May 18, 1918. Serial No. 235,233.

*To all whom it may concern:*

Be it known that I, JOSEPH H. TAUSCH, a citizen of the United States, residing at the city of Waukegan, in the county of Lake and State of Illinois, have invented certain new and useful Improvements in Automobile Road-Lights, of which the following is a specification.

My invention relates to devices for causing the lights of a moving vehicle to turn in conformity to changes in the direction of the vehicle itself. The object thereof is to provide a simple and effective device readily attachable to automobiles of standard type; one in which the mechanism is inclosed and protected against dust, and also to provide a mechanism which is adapted to be connected with the drop arm of an automobile steering gear, and conform in its movements to the movements of the steering gear to which it is attached without using special mechanism or indirect means for the purpose; also to provide a mechanism in which the devices by which it is operatively connected to the steering apparatus are simplified and reduced to the minimum; and, for the accommodation of which, practically no changes are required in the structure of an ordinary automobile.

The principles of my invention are illustrated in the drawings, in which—

Figure 1 shows a front view of my improved apparatus;

Fig. 2 is a modification thereof;

Fig. 3 is an enlarged section on the line 3—3 of Fig. 1;

Fig. 4 is a plan view on the line 4—4 of Fig. 1;

Fig. 5 is a fragmentary detail view showing the operative connection between the steering gear drop arm and the drop arm of the present invention.

Further describing my invention with reference to the drawings, in which like characters of reference denote like parts throughout: 1 and 2 are the main chassis bars of an automobile. 3 and 4 are standards having projecting feet 5 attached to the chassis bars by bolts 6. The said standards are tubular and at the upper and lower portions thereof are provided with bearings 7 and 8 which may be of fiber or bearing metal. Shafts 10 are mounted in said bearings, and heads 11 are irrevolubly attached to the upper ends 12 of the shaft by rivets 13 or other suitable means. The lower end of the shaft 10 is provided with a spiral gear 15 which meshes with a corresponding spiral gear 16 carried on a transverse shaft 17 mounted in bearings 18 and 19 in the shell of a gear casing 19'. The said gears should be so cut that when connected to the steering apparatus the movement of lamp shaft 10 will be such as to turn the light carrying head 11 in the direction of the vehicle movement. It will be noted that by cutting the gears right or left handed, any construction of steering gear which may be encountered may be provided for. The said casing should be formed integrally with the standard so that when the latter is attached to the chassis frame the gears and bearing will be protected from dust. The heads 11 may have off-set ears 20 provided with holes 21, by which, by means of bolts 22 the lamp brackets 23 may be attached to the heads. Levers 25 may be off-set from the heads and a connecting rod 26, having its ends attached to the extremities of said levers 25 provides means by which the heads with the lamps carried thereby are moved in unison when the shaft 10 is rotated. Ears 28 may be extended, preferably in a backward direction, from the upper part of the standard and a brace-rod 29 connecting such ears gives rigid support to the standards in their relation to each other.

A modified construction of the device is shown in Fig. 2, uniform movement of the shafts 10 and the heads mounted thereon being secured by means of spiral intermeshing gears in both of the vertical standards 3 and 4. When so constructed the gears 16 are both mounted upon a shaft 30, which replaces the short shaft 17 shown in Fig. 1. When the modified construction is used it is evident that the levers 25 and the connecting rod 26 may be omitted.

A drop arm 35 attached to the shaft 17 or to the connecting shaft 30, in case the latter is used, may be connected to the steering gear; preferably this connection is made to the steering gear drop arm 38 by a connecting rod 36. Parallelism of the movement of arm 35 with that of the steering gear drop arm may be thus attained, and as both drop arms are substantially in the same plane the connection is simple and direct and limited to the single connecting rod. By providing a series of holes as shown at 37 the throw of lever 35 may be lengthened or shortened in relation to the movement of the steering gear drop arm, and corresponding modification of the rotation of the heads 11 and of the lamps carried thereby may be obtained.

I claim:

1. In a dirigible automobile road light, the combination with the chassis and steering gear of an automobile, of a pair of standards vertically mounted on the chassis, vertical shafts journaled in and projecting beyond the upper ends of the standards, lamp supporting heads having depending tubular portions secured on the upper ends of said shafts and having enlarged horizontal flat upper ends adapted to have lamps bolted thereon, said heads being also provided with offset arms, a rod extending between and pivotally connected to said arms, a spiral gear secured on the lower end of one of said vertical shafts, a second spiral gear meshing with the first and journaled transversely thereto, and means operatively connecting the last named gear to the automobile steering gear.

2. In a dirigible automobile road light, the combination with the chassis and the steering gear of an automobile, of a hollow upright standard mounted on the chassis having an enlarged chambered lower end and an integral bearing adjacent thereto, the upper end of said standard having a bearing secured therein, a vertical shaft journaled in the bearings of said standard with its upper end projecting above the upper end of the standard, a lamp supporting head having an enlarged horizontal flat upper portion adapted to have a lamp bolted thereon and provided with a depending tubular portion within which the projecting upper end of said shaft is secured, and means operatively connecting the lower end of said shaft with said steering gear.

3. In a dirigible automobile road light, the combination with the chassis and the steering gear of an automobile, of a hollow upright standard mounted on the chassis and having a journaled bearing adjacent its lower end, the upper end of said standard having a journaled bearing secured therein with its upper portion projecting above the upper end of the standard, a vertical shaft journaled in the standard bearings with its upper end projecting above the upper end of the standard and the adjacent bearing, a lamp supporting head provided with a tubular depending portion within which the projecting upper end of said shaft is secured, said depending tubular portion snugly surrounding the projecting portion of the upper bearing and resting upon the upper end of the standard, and means operatively connecting said shaft with said steering gear.

JOSEPH H. TAUSCH.